US009210730B2

(12) United States Patent
Sartori et al.

(10) Patent No.: US 9,210,730 B2
(45) Date of Patent: Dec. 8, 2015

(54) SYSTEM AND METHOD FOR DIRECT MOBILE COMMUNICATIONS LINK ESTABLISHMENT

(75) Inventors: Philippe Sartori, Algonquin, IL (US); Wan Lei, Beijing (CN); Brian Classon, Palatine, IL (US); Yunsong Yang, San Diego, CA (US); Anthony C. K. Soong, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 386 days.

(21) Appl. No.: 13/458,278

(22) Filed: Apr. 27, 2012

(65) Prior Publication Data

US 2013/0286862 A1    Oct. 31, 2013

(51) Int. Cl.
  *H04W 76/02*    (2009.01)
  *H04W 8/00*    (2009.01)
  *H04W 28/06*    (2009.01)
  *H04W 92/18*    (2009.01)

(52) U.S. Cl.
  CPC ............ *H04W 76/023* (2013.01); *H04W 8/005* (2013.01); *H04W 28/06* (2013.01); *H04W 92/18* (2013.01)

(58) Field of Classification Search
  CPC ... H04W 72/085; H04W 24/10; H04W 72/02; H04W 28/048; H04W 48/12; H04W 72/0426; H04W 72/048; H04W 72/1231; H04W 92/18; H04W 72/04
  USPC .............. 370/329, 252, 208, 328, 337, 395.4, 370/395.42; 455/450, 422.1, 452.2, 512, 455/550.1, 67.13
  See application file for complete search history.

(56) References Cited

U.S. PATENT DOCUMENTS

| | | | |
|---|---|---|---|
| 2009/0262872 A1* | 10/2009 | Prasad et al. | 375/341 |
| 2010/0159936 A1* | 6/2010 | Brisebois et al. | 455/450 |
| 2010/0202304 A1* | 8/2010 | Mao et al. | 370/252 |
| 2010/0309869 A1* | 12/2010 | Kim et al. | 370/329 |
| 2011/0053585 A1* | 3/2011 | Otonari | 455/422.1 |
| 2011/0300892 A1* | 12/2011 | Hakola et al. | 455/512 |
| 2011/0317569 A1* | 12/2011 | Kneckt et al. | 370/252 |
| 2012/0287878 A1* | 11/2012 | Moon et al. | 370/329 |
| 2013/0016666 A1* | 1/2013 | Chen et al. | 370/329 |
| 2014/0018010 A1* | 1/2014 | Gao et al. | 455/67.13 |

OTHER PUBLICATIONS

Corson, M.S., et al., "Toward Proximity-Aware Internetworking," IEEE Wireless Communications, Dec. 2010, pp. 26-33.
Laroia, R., "Future of Wireless? The Proximate Internet," Qualcomm, Comsnets, Jan. 7, 2010, 38 pages.

* cited by examiner

*Primary Examiner* — Dang Ton
*Assistant Examiner* — Sai Aung
(74) *Attorney, Agent, or Firm* — Slater & Matsil, LLP

(57) ABSTRACT

A method of establishing a direct mobile communications (DMC) link between a first user equipment (UE) and a second UE, where at least one of the first UE and the second UE is communicating on a first cellular link includes requesting that at least one of the first UE and the second UE participate in an evaluation procedure to determine a potential quality of a DMC link proposed between the first UE and the second UE. The method also includes receiving a report from at least one of the first UE and the second UE indicating the potential quality of the DMC link proposed between the first UE and the second UE according to the evaluation procedure. The method further includes establishing the DMC link between the first UE and the second UE if the potential quality of the DMC link exceeds a predetermined threshold.

36 Claims, 12 Drawing Sheets

SYSTEM AND METHOD FOR DIRECT MOBILE COMMUNICATIONS LINK ESTABLISHMENT

TECHNICAL FIELD

The present disclosure relates generally to digital communications, and more particularly to a system and method for direct mobile communications (DMC) link establishment.

BACKGROUND

In the field of wireless communication, there has been increasing demand for direct device-to-device communication (D2D), direct mobile communication (DMC), and the like. This form of communications refers to a communications mode between two or more user equipment (UE) that does not include or does not always include a communications controller in a communication path between or among the UEs. DMC will be used herein to denote this form of communication. Generally, DMC communications involve direct communications between multiple DMC devices (the DMC devices are also commonly referred to as User Equipment (UE), mobile station (MS), mobile, communications device, subscriber, terminal, and the like) occurring as point-to-point (PTP) communications without having the communications passing through and being fully controlled by a communications controller, such as an evolved NodeB (eNB), a NodeB, a base station, a controller, a communications controller, and the like.

FIG. 1a illustrates a prior art communications system 100, wherein UEs, such as UE 110 and UE 115, are communicating with an eNB 105. Communications where the data transits through the communications controller, such as eNB 105, may be generally referred to as cellular communications. It is noted that while only two UEs are represented on the figure, in practice, there may be more than two UEs communicating with each other. The information transfer may occur between two UEs, or more than two UEs if a multicast group is set up.

FIG. 1b illustrates a prior art communications system 150, wherein UE 160 and UE 165 are communicating using DMC communications. As shown in FIG. 1b, communications system 150 includes an eNB 155, but with UE 160 and UE 165 using DMC communications, their communications are directly exchanged without interaction with eNB 155.

SUMMARY OF THE DISCLOSURE

Technical advantages are generally achieved by embodiments of the present disclosure which provide a system and method for DMC link establishment.

In accordance with an example embodiment of the present disclosure, a method of establishing a direct mobile communications (DMC) link between a first user equipment (UE) and a second UE, wherein at least one of the first UE and the second UE is communicating on a first cellular link is provided. The method includes requesting, by a communications controller, that at least one of the first UE and the second UE participate in an evaluation procedure to determine a potential quality of a DMC link proposed between the first UE and the second UE. The method also includes receiving, by the communications controller, a report from at least one of the first UE and the second UE indicating the potential quality of the DMC link proposed between the first UE and the second UE according to the evaluation procedure. The method further includes establishing, by the communications controller, the DMC link between the first UE and the second UE if the potential quality of the DMC link exceeds a predetermined threshold.

In accordance with another example embodiment of the present disclosure, a method of operating a first user equipment (UE) is provided. The method includes receiving, from a communications controller, a participation request to participate in an evaluation procedure to determine a potential quality of a direct mobile communications (DMC) link between the first UE and a second UE, and transmitting, to the communications controller, a report indicating the potential quality of the DMC link proposed between the first UE and the second UE.

In accordance with another example embodiment of the present disclosure, a communications controller is provided. The communications controller includes a processor, and a receiver operatively coupled to the processor. The processor requests that at least one of a first user equipment (UE) and a second UE participate in an evaluation procedure to determine a potential quality of a direct mobile communications (DMC) link proposed between the first UE and the second UE, where at least one of the first UE and the second UE are communicating on a first cellular link, and establishes the DMC link between the first UE and the second UE if the potential quality of the DMC link exceeds a predetermined threshold. The receiver receives a report from at least one of the first UE and the second UE indicating the potential quality of the DMC link proposed between the first UE and the second UE according to the evaluation procedure.

In accordance with another example embodiment of the present disclosure, a first user equipment (UE) is provided. The first UE includes a receiver, and a transmitter operatively coupled to the receiver. The receiver receives, from a communication controller, a participation request to participate in an evaluation procedure to determine a potential quality of a direct mobile communications (DMC) link between the first UE and a second UE. The transmitter transmits, to the communications controller, a report indicating the potential quality of the DMC link proposed between the first UE and the second UE.

One advantage of an embodiment is that a DMC link between devices occurs more rapidly so that the devices can communicate quicker.

A further advantage of an embodiment is that communications controller initiated DMC links between communications devices help to improve communications performance of a communications system by helping to reduce a load on communications controllers and communications resources.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

One embodiment of the disclosure relates to direct mobile communications (DMC). For example, a communications controller determines that there is a need to establish a DMC link between two User Equipments (UE) and initiates a discovery procedure for the two UE to help decide if a DMC link is feasible. The communications controller establishes the DMC link if the DMC link is feasible.

The present disclosure will be described with respect to example embodiments in a specific context, namely a communications system that supports cellular communications as well as DMC communications. The disclosure may be applied to communications systems that are compliant to technical standards, such as Third Generation Partnership Project (3GPP) Long Term Evolution (LTE), WiMAX, IEEE 802.16m, IEEE 802.11x, and the like, as well as non-standards compliant communications systems.

Figure 1A:
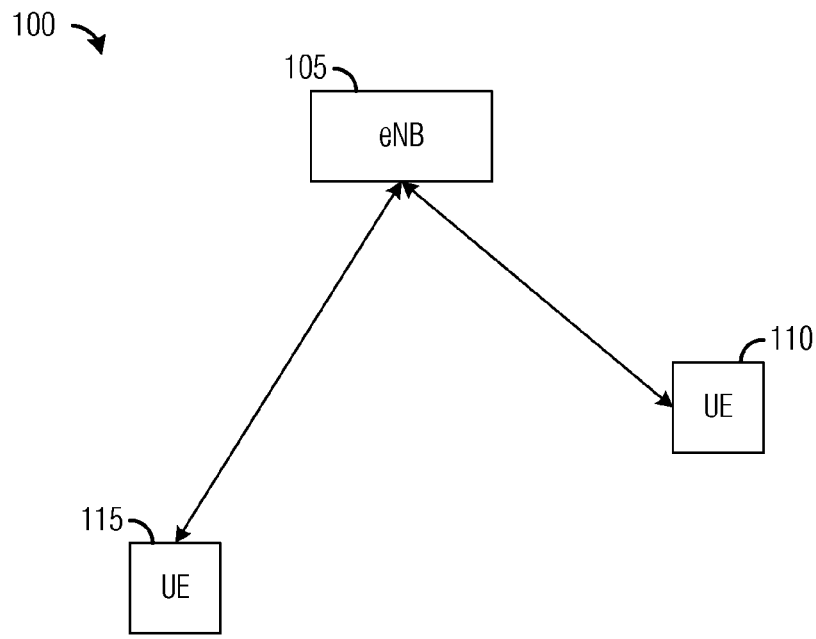
FIG. 1a illustrates an example prior art communications system, wherein UEs are communicating with an eNB 105.
Figure 1B:
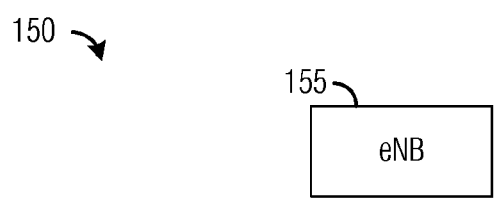
FIG. 1b illustrates an example prior art communications system, wherein UEs are communicating using DMC communications.
Figure 1B:
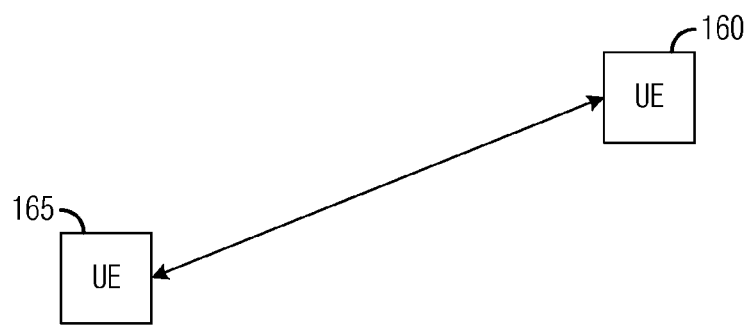
Figure 2A:
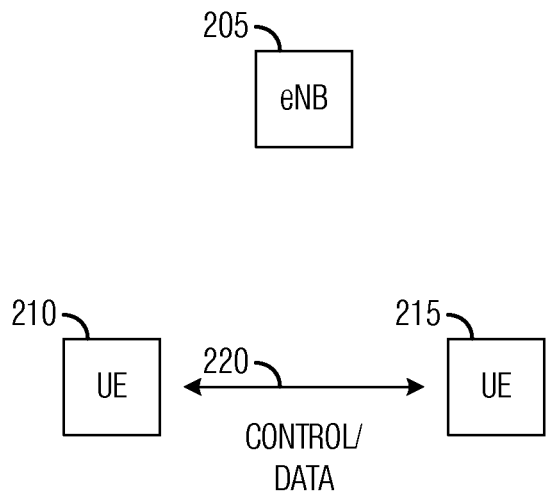
FIG. 2a illustrates an example communications system where UEs initiate DMC links according to example embodiments described herein.

FIG. 2a illustrates a communications system 200 where UEs initiate DMC links. Communications system 200 includes an eNB 205 and UEs, such as UE 210 and UE 215. While it is understood that communications systems may employ multiple eNBs capable of communicating with a number of UEs, only one eNB and two UEs are illustrated for simplicity.

In a situation where UEs initiate DMC links, control information is exchanged between the UEs to establish a DMC link and the data is subsequently exchanged once the DMC link is established. UE initiation of DMC links is commonly referred as device centric DMC operation. As shown in FIG. 2a, UE 210 and UE 215 exchange control information to establish a DMC link 220, which is later used to allow UE 210 and UE 215 to share data.

Figure 2B:
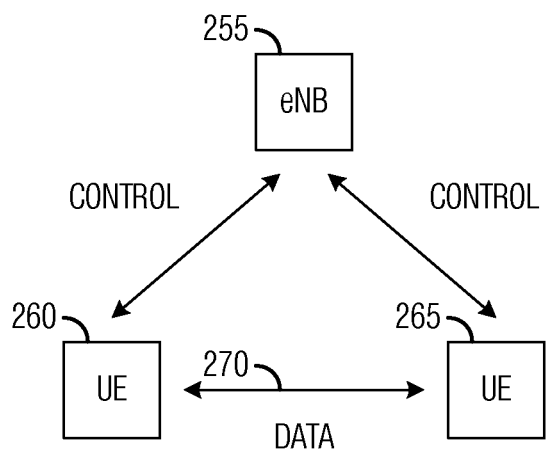
FIG. 2b illustrates an example communications system where communications controllers initiate DMC links according to example embodiments described herein.

FIG. 2b illustrates a communications system 250 where communications controllers initiate DMC links. Communications system 250 includes an eNB 255 and UEs, such as UE 260 and UE 265. In a situation where an eNB establishes DMC links, the eNB exchanges control information with the UEs to establish a DMC link. Once the DMC link is established, the UEs exchange data with each other. eNB initiation of DMC links is commonly referred to as network centric DMC operation. As shown in FIG. 2b, eNB 255 exchanges control information with UE 260 and UE 265 to establish a DMC link 270, which is later used to allow UE 260 and UE 265 to share data.

It is noted that the examples shown in FIG. 2a and FIG. 2b correspond to two extreme situations. In practice, a DMC deployment may likely be a hybrid of the device centric and the network centric solutions shown in FIGS. 2a and 2b. In particular, for a hybrid solution that involves a combination of the device centric and the network centric solutions, the data and/or control flow shown in FIG. 2b may be modified to also have control information also being exchanged between UEs 260 and 265 in addition to the data being exchanged over DMC link 270.

The DMC link may occur in the cellular portion of the band where uplink communications typically occur. The DMC link may also occur in the downlink or a combination of uplink and downlink spectrums, depending on the system configuration. As an example, the DMC link may occur on another component carrier, if carrier aggregation is used, in either uplink or downlink. The DMC transmission may use either Orthogonal Frequency Division Multiplexing (OFDM) as a modulation, especially if the transmission occurs in one downlink transmission, or Discrete Fourier Transform Spread Orthogonal Frequency Division Multiplexing (DFT-SOFDM), especially if the transmission occurs on an uplink band. It should be noted that the multiplexing (or multiple access) techniques discussed above are illustrative examples and that other multiplexing techniques could be used.

Although FIG. 2b illustrates a situation where an eNB initiates the establishment of DMC links, other network entities in the communications system can also initiate the DMC links, such as a Mobility Management Entity (MME), an eNB, a Base Station Controller (BSC), an Operation and Management server (OAM), and the like.

Although communications system 200 and communications system 250 are shown with only DMC links, in general, a communications system can support different types of communications. As an example, communications systems 200 and 250 can support cellular communications as well as DMC communications.

In general, DMC network entry is different from typical cellular network entry. In order to make DMC transmissions successful, neighborhood discovery and DMC link establishment may have to be fast and simple. For a network centric DMC operation, having a centralized controller (e.g., an eNB, MME, and the like) determine the proximity of devices offers the opportunity for having an extremely fast DMC link establishment. The presence of the centralized controller may also afford a simple establishment procedure that is potentially seamless for users. It is noted that the centralized controller may also be a logical entity that exists in one or more physical entities.

As an example, an eNB may initiate an operating mode switch for UEs that are served by the eNB into a DMC operating mode. The eNB may initiate the operating mode switch according to a presence of a need for DMC operation among some of its served UEs, as well as compatible operating and/or network conditions.

Figure 3:
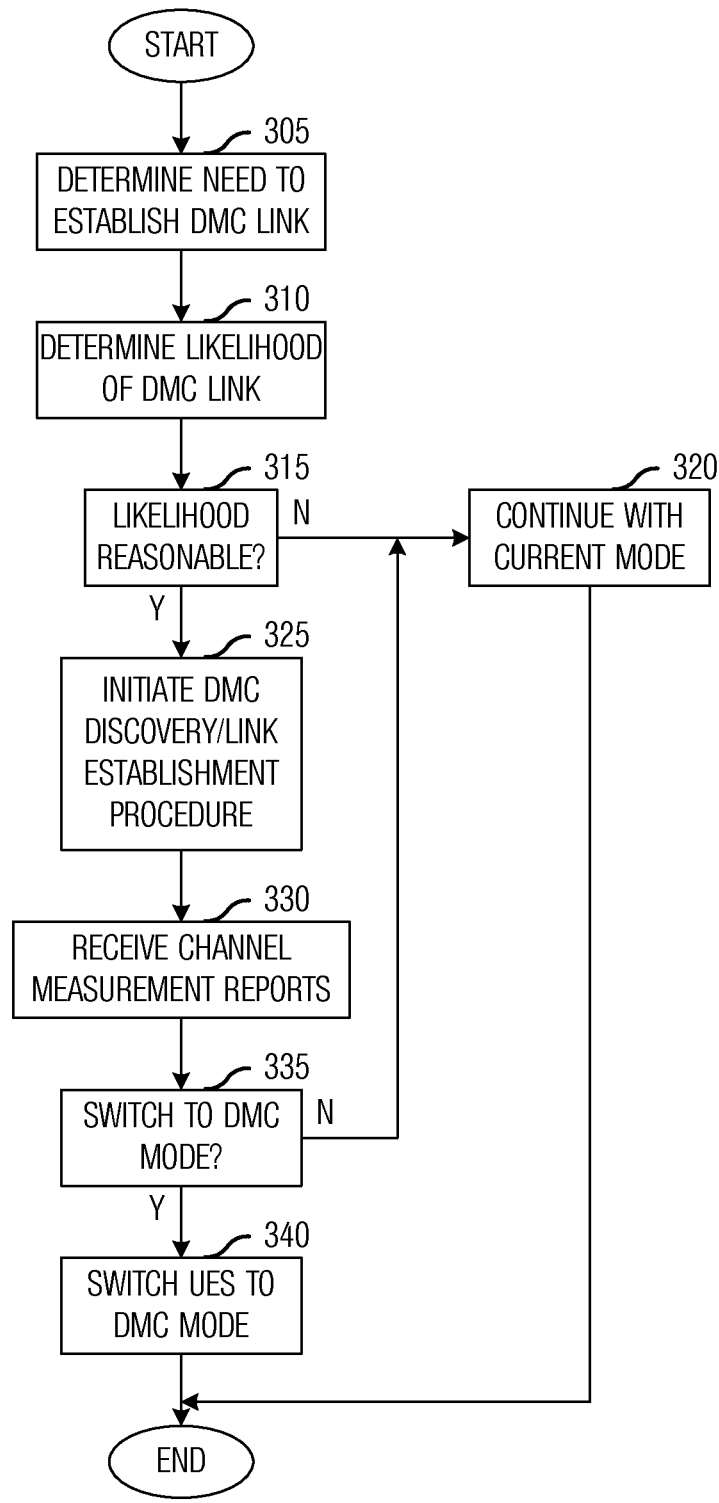
FIG. 3 illustrates an example flow diagram of operations in an eNB initiated operating mode switch for UEs served by the eNB according to example embodiments described herein.

FIG. 3 illustrates a flow diagram of operations 300 in an eNB initiated operating mode switch for UEs served by the eNB. Operations 300 may be indicative of operations occurring in an eNB, such as eNB 255, as the eNB performs an eNB initiated operating mode switch for UEs that are served by the eNB.

Operations 300 may begin with the eNB determining a need for establishing a DMC link for two or more UEs served by the eNB (block 305). As an example, the eNB evaluates conditions, such as traffic load, available network resources to be reallocated, interference environment, availability of UEs to operate in a DMC mode, and the like, to determine if there is a need to establish a DMC link. In general, if there is a high traffic load at the eNB, the eNB may desire to switch as many UEs into operating in a DMC mode as possible since doing so frees up network resources that the eNB may utilize for cellular communications. However, in order for UEs to operate in a DMC mode, there may need to be UEs desiring to communicate with each other. Additionally, these UEs also need to be capable of operating in a DMC mode. It is also noted that the interference of DMC communications to other communications and/or devices or communications entities in the network may be a factor for deciding to turn on or off a DMC link.

The eNB may also determine a likelihood of success in establishing a DMC link for two or more UEs (block 310). As an example, the eNB may examine factors such as where the UEs are operating (e.g., the UEs are operating in a single cell, the UEs are operating in neighboring cells, the UEs are operating in far-apart cells, and the like), the eNB may also examine radio conditions of each of the UEs (as an example, if a first UE has significantly greater path loss than a second UE, then establishing a DMC link may not be desirable), and the like.

The eNB may perform a check to determine if the likelihood of success in establishing a DMC link is reasonable (block 315). As an example, the eNB may compare the likelihood of success with a threshold. If the likelihood of success in establishing a DMC link is not reasonable, the eNB may have the UEs continue operating in their current operating mode, e.g., cellular communications (block 320).

However, if the likelihood of success in establishing a DMC link is reasonable, the eNB may initiate a DMC discovery/link establishment procedure to evaluate a DMC link between the UEs (block 325). As an example, the eNB may evaluate the DMC link by having at least some of the UEs measure channel(s) between themselves and the other UEs with the other UEs transmitting a beacon(s), such as a reference signal, to assist the UEs in their measurement of the channel(s). The beacon may be explicit like a reference signal or implicit like the transmission from some other control channel. As an example, if there are two UEs that will be utilizing the DMC link, then a first UE may measure a channel between itself and a second UE according to a beacon transmitted by the second UE. Additionally, the second UE may measure a channel between itself and the first UE according to a beacon transmitted by the first UE. A detailed discussion of the DMC discovery/link establishment procedure is provided below.

The eNB may receive measurement report(s) of the channel(s) from the UE(s) (block 330). As an example, the eNB may receive a measurement report including a channel quality measurement such as a signal to noise ratio (SNR), a signal to interference plus noise ratio (SINR), and the like, from UEs making channel measurements. It is noted that measurement reports from each UE involved in the DMC link may result in a more accurate evaluation of the DMC link, however, it is not necessary to have measurement reports from each UE.

The eNB may perform a check to determine if the UEs should switch to DMC operating mode (block 335). As an example, the decision to switch the UEs to the DMC operating mode may be made according to, or partly according to, the measurement reports. As an example, if the measurement report(s) indicates that the DMC link will be a good quality link, then the eNB may switch the UEs into the DMC operating mode (block 340). However, if the measurement report(s) indicates that the DMC link will be a poor quality link, then the eNB may have the UEs continue operating in their current operating mode, e.g., cellular communications (block 320).

As an example, the eNB may compare the measurement report(s) against a predetermined threshold and if the measurement report(s) indicate that the DMC link exceeds the predetermined threshold, then the DMC link may be a good quality link, while if the measurement report(s) indicate that the DMC link does not exceed the predetermined threshold, then the DMC link may be a poor quality link. Examples of the predetermined threshold may include signal to interference plus noise ratio (SINR) or signal to noise ratio (SNR) values in the range of 10 to 15 dB. If the measurement report indicates SINR (or SNR) values greater than 10 to 15 dB, then the DMC link may be a good quality link, while if the SINR (or SNR) values are less than 10 to 15 dB, then the DMC link may be poor quality links. It may be possible to use a lower predetermined threshold, for example, in the range of less than 10 dB, if interference reduction techniques are used. However, interference reduction techniques are beyond the scope of the examples discussed herein.

According to an example embodiment, an entity other than an eNB may initiate an operating mode switch for UEs that are served by the eNB into a DMC operating mode. The entity may initiate the operating mode switch according to a presence of a need for DMC operation among some of its served UEs, as well as compatible operating and/or network conditions. As an example, the operating mode switch may be initiated by a UE, an MME, another eNB, an OAM, a BSC, and the like.

It is noted that some of the operations described herein may be optional in nature. The optional operations may help to produce better results or improve performance. However, the optional operations may not be required.

Figure 4:
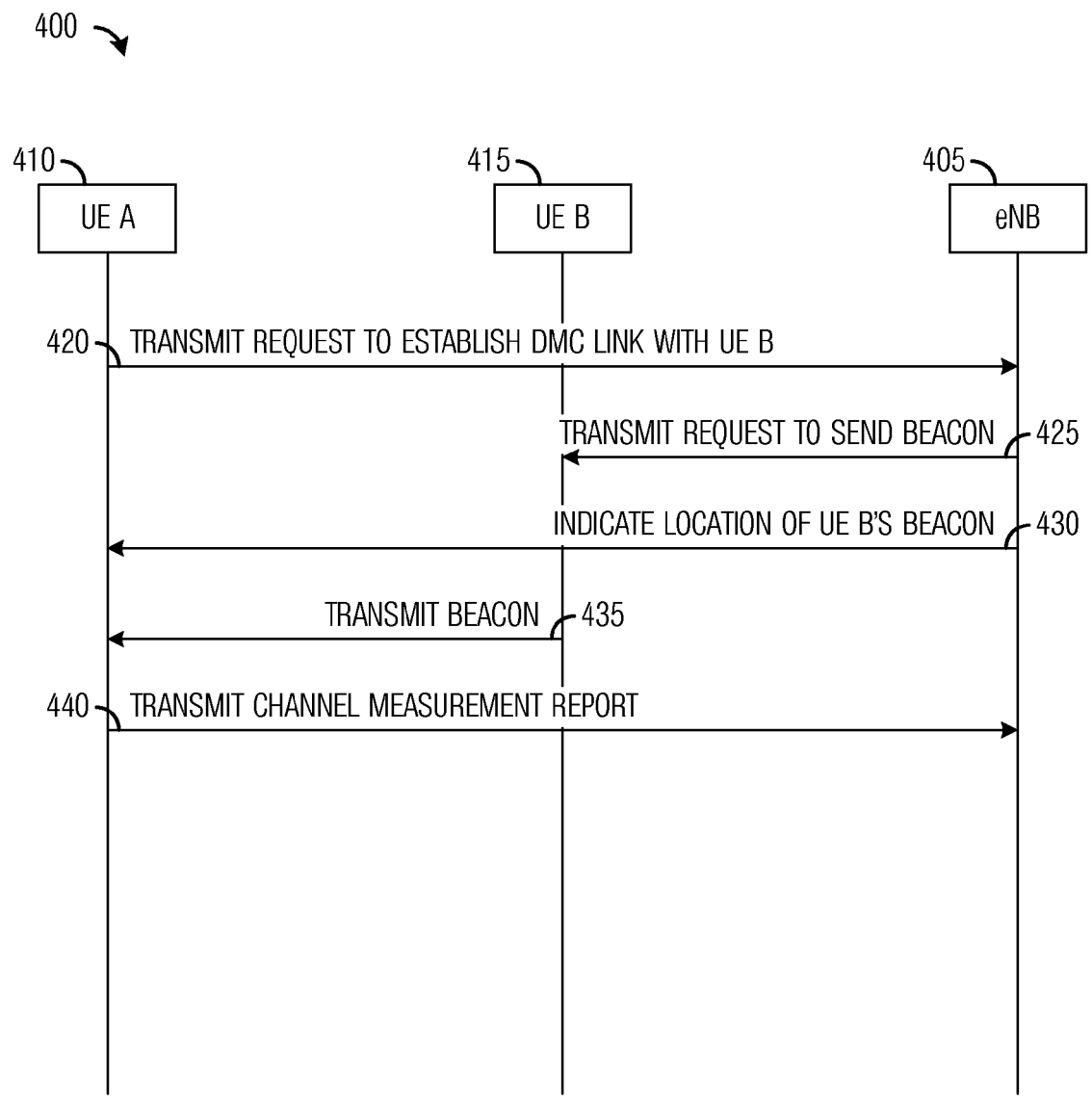
FIG. 4 illustrates an example diagram of a message exchange in an entity initiated operating mode switch, wherein the entity is not an eNB serving the UEs involved in the operating mode switch according to example embodiments described herein.

FIG. 4 illustrates a diagram of a message exchange 400 in an entity initiated operating mode switch, wherein the entity is not an eNB serving the UEs involved in the operating mode switch. As shown in FIG. 4, the entity initiating the operating mode switch is a UE served by the eNB, but other entities, such as an MME, another eNB, an OAM, a BSC, and the like, may initiate the operating mode switch. Message exchange 400 includes messages from eNB 405, UE A 410, and UE B 415.

Without loss of generality, and considering a situation where the operating mode switch is initiated by UE A 410, UE A 410 may initiate the operating mode switch by transmitting a request to eNB 405. The request asks eNB 405 to establish a DMC link between UE A 410 and UE B 415 (shown as event 420). The request may be in the form of explicit or implicit messaging. Although the discussion presents a situation where one of the UEs (UE A 410 of UE A 410 and UE B 415, for example) that will be utilizing the DMC link initiates the operating mode switch, it may be possible that a UE that will not actually be utilizing the DMC link initiates the operating mode switch. Additionally, another network entity instead of a UE may initiate the operating mode switch. As an example, another eNB, a MME, a BSC, an OAM, and the like, may initiate the operating mode switch.

eNB 405 may transmit a request to UE B 415, wherein the request asks that UE B 415 transmit a beacon, e.g., a reference signal or some other signal known by both UE B 415 and UE A 410 (shown as event 425). As an example, the request also includes network resource information specifying when (time) and where (frequency band) UE B 415 is to transmit the beacon. The request may also include a specification of a beacon to be used by UE B 415. eNB 405 may also transmit a message to UE A 410, wherein the message may include the network resource information that informs UE A 410 about when and/or where UE B 415 will transmit its beacon (shown as event 430). UE B 435 may then transmit its beacon according to the network resource information provided by eNB 405 (shown as event 435).

According to an example embodiment, in addition to having UE B 415 transmit a beacon and UE A 410 making a measurement of a channel between UE B 415 and UE A 410, eNB 405 may also have UE A 410 transmit a beacon (possibly different from the beacon transmitted by UE B 415) and UE B 415 making a measurement of a channel between UE A 410 and UE B 410.

UE A 410 may make a measurement of the channel between UE B 415 and UE A 410 according to the beacon. UE A 410 may transmit a channel measurement report to eNB 405 (shown as event 440). As an example, the channel measurement report may include a SNR, a SINR, and the like.

It is noted that the eNB may request other UEs to measure the beacon so as to determine the interference impact of the DMC transmission on other communication entities. Alternatively, the potential DMC UEs may also measure the transmission strength from other UEs to obtain the interference information. As an example, the interference information may be used to ensure that other cellular communications or even other DMC communications do not interfere significantly with the DMC communications. Furthermore, interference to other communications, including other cellular communications and/or other DMC communications, from the DMC communications may be determined and considered by the eNB in its decision to establish the DMC link.

Figure 5A:
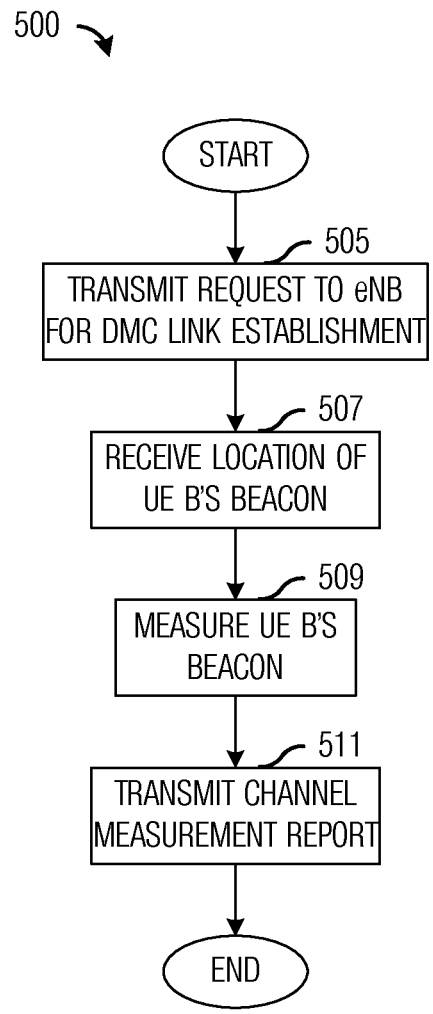
FIG. 5a illustrates an example flow diagram of operations occurring at an initiating UE that is participating in an UE initiated operating mode switch according to example embodiments described herein.

FIG. 5a illustrates a flow diagram of operations 500 occurring at an initiating UE that is participating in an UE initiated operating mode switch. Operations 500 may be indicative of operations occurring in a UE, such as UE A 410 of FIG. 4, as the UE participates in the UE initiated operating mode switch.

Operations 500 may begin with the UE transmitting a request to an eNB serving the UE requesting that the eNB establish a DMC link for the UE and one or more other UEs (block 505). As an example, the request may specify the other UEs that may make use of the DMC link. As an example, the request may specifically identify the other UEs. As another example, the request may specify a UE group that is to make use of the DMC link. As yet another example, the request may implicitly request that the DMC link include responding UEs within a specified distance from the UE.

The UE may receive a response, e.g., a participation request, from the eNB (block 507). As an example, the response from the eNB may include location information of a beacon to be transmitted by at least one other UE. As another example, if there is one other UE that will be participating with the UE, then the location information may specify where and/or when the UE should listen to detect the beacon transmitted by the other UE. As another example, if there is a plurality of other UEs, then the location information may specify for each of the other UEs where and/or when the UE should listen to detect the beacon transmitted by each respective UE. If the other UEs are transmitting different beacons, the response from the eNB may include information about the different beacons that may help the UE detect the different beacons.

The UE may measure a channel between itself and the other UE according to the beacon transmitted by the other UE (block 509). As an example, the UE may make an SNR, a SINR, and the like, measurement of the channel. If there are multiple other UEs transmitting beacons, the UE may measure multiple channels, one for each of the other UEs. As another example, in addition to making a measurement of the channel according to the beacon, the UE may make use of historical information to adjust the measurement of the channel. As another example, the UE may average (apply a weight, filtering, determine a spread, apply a mathematical function, and the like) to the measurement of the channel with the historical information. The UE may transmit the channel measurement report to the eNB (block 511). The UE may receive a message including a DMC link allocation from the eNB and the UE may then commence operation in the DMC operating mode.

According to an example embodiment, in addition to measuring a channel based on a beacon transmitted by the other UE, the UE may also transmit a beacon of its own to help the other UE measure a channel between the two UEs. In such a scenario, the UE may receive instruction from the eNB specifying where and/or when the UE may transmit its beacon.

Figure 5B:
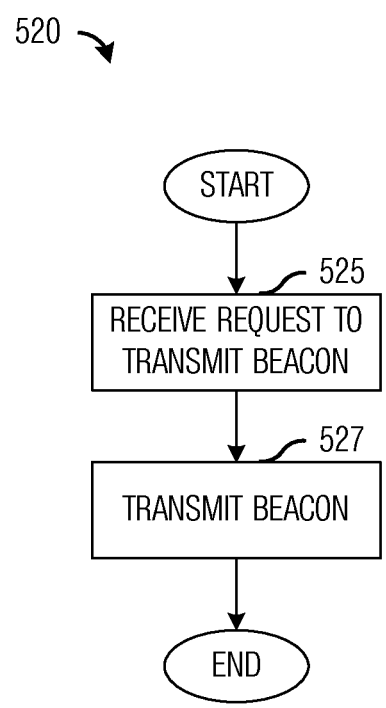
FIG. 5b illustrates an example flow diagram of operations occurring at a responding UE that is participating in an UE initiated operating mode switch according to example embodiments described herein.

FIG. 5b illustrates a flow diagram of operations 520 occurring at a responding UE that is participating in an UE initiated operating mode switch. Operations 520 may be indicative of operations occurring in a UE, such as UE B 415 of FIG. 4, as the UE participates in the UE initiated operating mode switch.

Operations 520 may begin with the UE receiving a request from an eNB to transmit a beacon (block 525). As an example, the request from the eNB specifies location information as to when (e.g., which subframe) and/or where (e.g., which time/frequency resource within the subframe) the UE is to transmit the beacon. Furthermore, the request from the eNB may specify the beacon that the UE is to transmit. The UE may then transmit the beacon according to the location information (block 527). The UE may receive a message including a DMC link allocation from the eNB and the UE may then commence operation in the DMC operating mode.

According to an example embodiment, in addition to transmitting the beacon, the UE may also measure a channel based on a beacon transmitted by another UE. In such a scenario, the UE may receive instruction from the eNB specifying where and/or when the UE may detect the beacon transmitted by the other UE. After measuring the channel, the UE may transmit the channel measurement to the eNB.

Figure 5C:
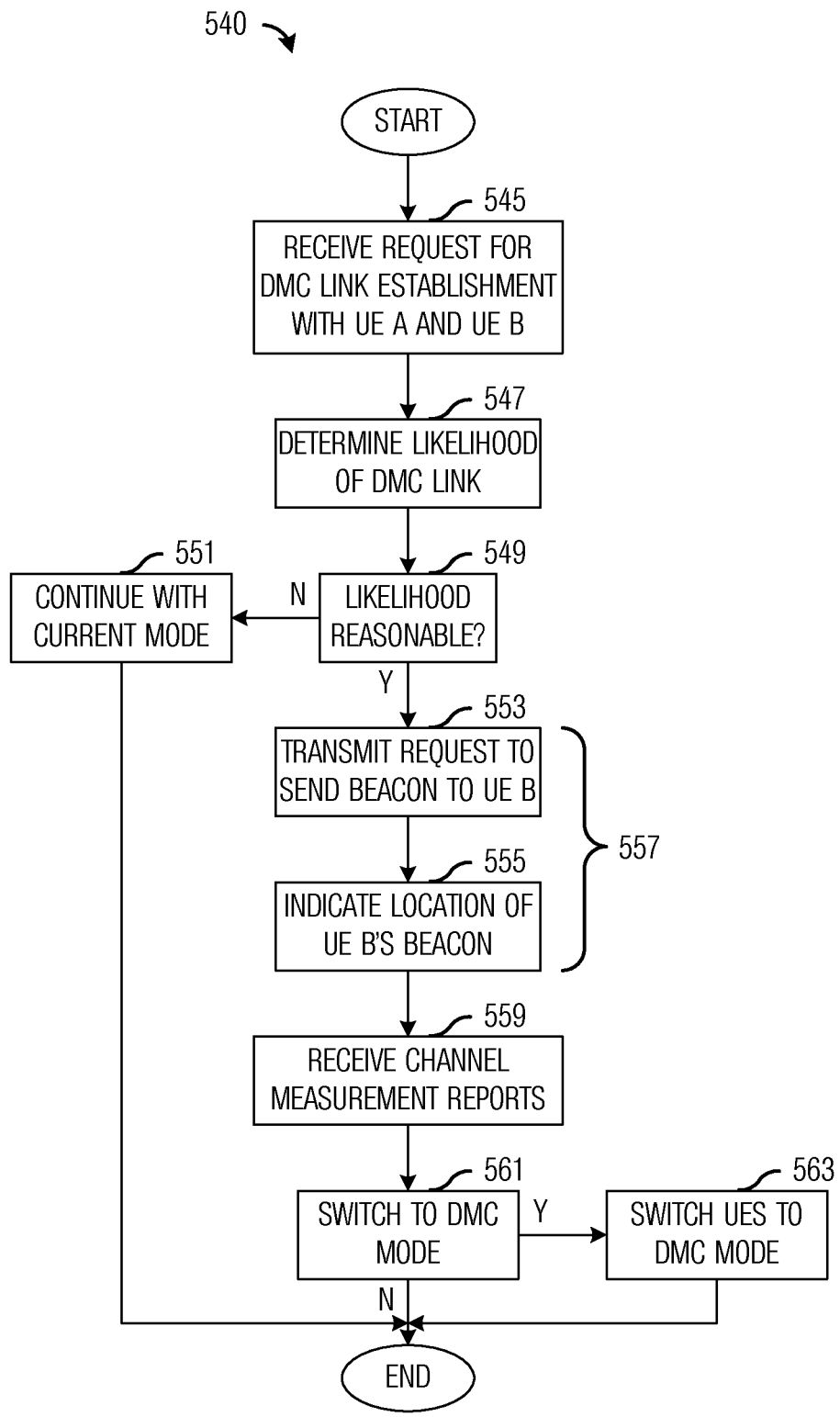
FIG. 5c illustrates an example flow diagram of operations occurring an eNB that is participating in an UE initiated operating mode switch according to example embodiments described herein.

FIG. 5c illustrates a flow diagram of operations 540 occurring in an eNB that is participating in an UE initiated operating mode switch. Operations 540 may be indicative of operations occurring in an eNB, such as eNB 405 of FIG. 4, as the eNB participates in the UE initiated operating mode switch.

Operations 540 may begin with the eNB receiving a request to establish a DMC link between two or more UEs (block 545). As discussed previously, the request may originate from one of the two or more UEs that will utilize the DMC link, a UE that will not be using the DMC link, a network entity (such as another eNB, a MME, a BSC, an OAM, and the like), and the like. According to an example embodiment, the request may specify which UEs are to utilize the DMC link.

The eNB may then determine a likelihood of success in establishing a DMC link for two or more UEs (block 547). As an example, the eNB may examine factors such as where the UEs are operating (e.g., the UEs are operating in a single cell, the UEs are operating in neighboring cells, the UEs are operating in far-apart cells, and the like), the eNB may also examine radio conditions of each of the UEs (as an example, if a first UE has significantly greater path loss than a second UE, then establishing a DMC link may not be desirable), and the like.

The eNB may perform a check to determine if the likelihood of success in establishing a DMC link is reasonable (block 549). As an example, the eNB may compare the likelihood of success with a threshold. If the likelihood of success in establishing a DMC link is not reasonable, the eNB may have the UEs continue operating in their current operating mode, e.g., cellular communications (block 551). It is noted that the threshold used for determining the likelihood of success in establishing a DMC link may be a binary value in some cases (e.g., as related to if the UEs are operating in a single cell or neighboring cells) or numerical values in other cases (e.g., as related to radio conditions). In general, the UEs should have similar radio condition, relatively independent of quality. As an example, a measurement of SINR (or SNR) values of the UEs should be less 5 to 10 dB of difference between SINR (or SNR) values.

The eNB may then transmit a request, e.g., a beacon request, to a subset of the UEs to be utilizing the DMC link to transmit a beacon (or beacons) (block 553) and indicate to each UE in the subset of the UEs a location where and/or when it should transmit the beacon or beacons, e.g., in a measurement request (block 555). As an example, the eNB may transmit the request to the subset of the UEs requesting that they transmit a beacon or beacons at specified locations (i.e., a network resource location). As an example, if there are two UEs using the DMC link, the eNB may send the request to one or both of the UEs. As another example, each of the UEs may transmit the same beacon in different locations (i.e., network resources). As another example, each of the UEs may transmit a different beacon in different locations. As another example, each of the UEs may transmit a different beacon in a single location. Collectively, block 553 and block 555 may be referred to as a DMC discovery/link establishment procedure (blocks 557).

As an example, the beacon may be transmitted in an uplink portion of a frequency band where transmissions occur, a downlink portion of the frequency band, or both the uplink portion of the frequency band and the downlink portion of the frequency band. As another example, the beacon may be transmitted in an uplink portion of a frequency band where cellular transmissions occur, a downlink portion of the frequency band, or both the uplink portion of the frequency band and the downlink portion of the frequency band. As yet another example, the beacon may be transmitted in an uplink portion of a frequency band where DMC transmissions occur, a downlink portion of the frequency band, or both the uplink portion of the frequency band and the downlink portion of the frequency band. As yet another example, the beacon may be transmitted in an uplink portion of a frequency band where cellular and DMC transmissions occur, a downlink portion of the frequency band, or both the uplink portion of the frequency band and the downlink portion of the frequency band.

The eNB may receive channel measurement reports (block 559). As an example, the eNB may receive channel measurement reports from some of the UEs that will be utilizing the DMC link. As an example, the eNB may receive as many channel measurement reports as there are UEs in the subset of UEs receiving the request to transmit a beacon. However, the UEs transmitting the channel measurement reports may not be the same UEs as the UEs in the subset of UEs.

The eNB may perform a check to determine if it should switch the operating mode of the UEs that will be utilizing the DMC link (block 561). As an example, the eNB may determine if the UEs should switch operating modes based on the channel measurement reports. If the eNB determines that the UEs should switch operating modes, then the eNB may send a mode switch message to the UEs (block 563). As an example, the mode switch message may include a mode switch indicator. Additionally, the mode switch message may also include resource information about network resources allocated to the DMC link. Furthermore, the mode switch message may also include information about a transmission order for the UEs using the DMC link. The mode switch message may also contain a maximum power that the UE may transmit. Additionally if the information is not sent with the mode switch message, the information may be sent in other messages individually or in a combination thereof.

It is noted that some of the operations described herein may be optional in nature. The optional operations may help to produce better results or improve performance. However, the optional operations may not be required.

Figure 6A:
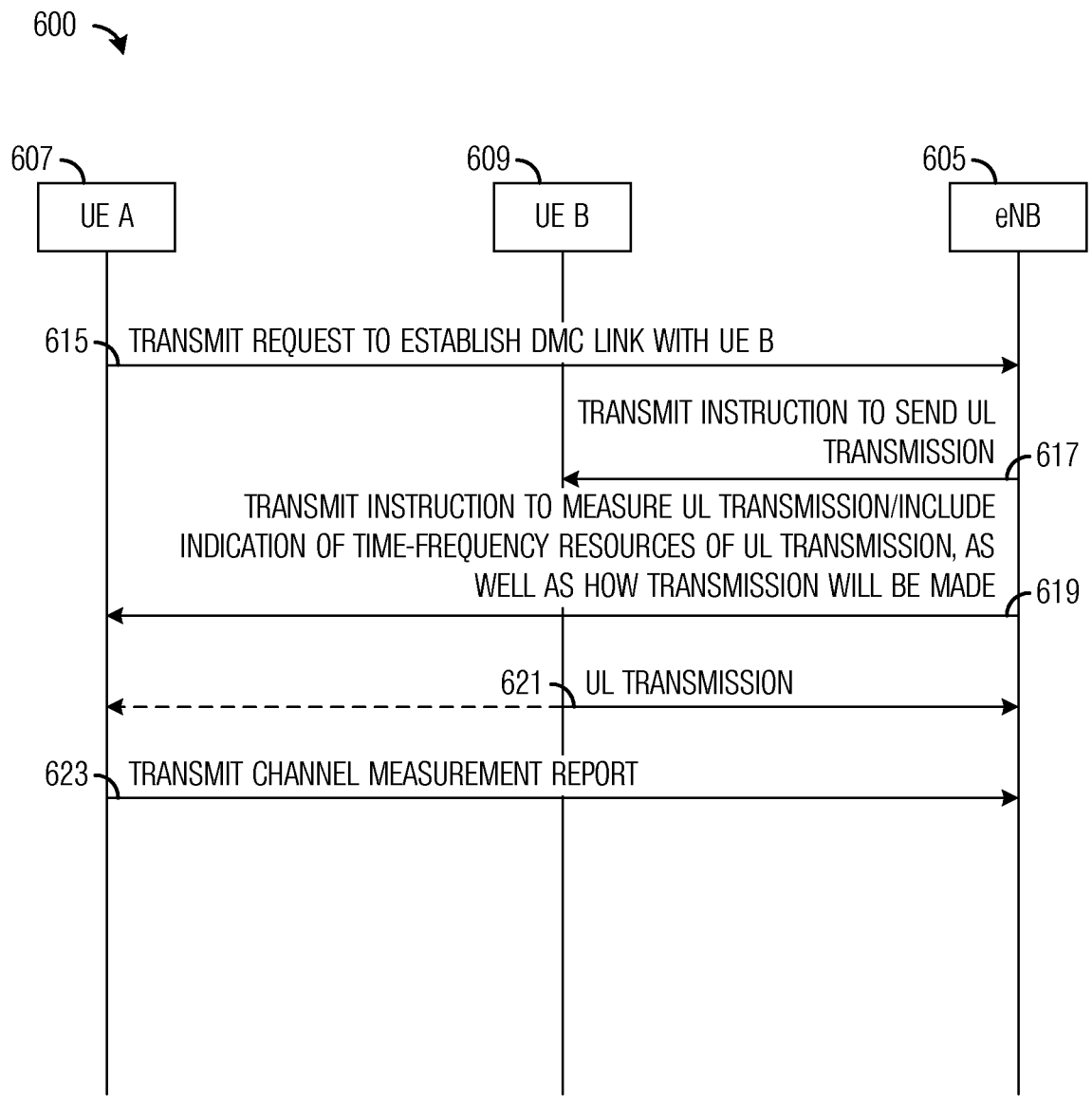
FIG. 6a illustrates an example diagram of a message exchange in a UE initiated operating mode switch for a 3GPP LTE compliant communications system according to example embodiments described herein.

FIG. 6a illustrates a diagram of a message exchange 600 in a UE initiated operating mode switch for a 3GPP LTE compliant communications system. Message exchange 600 includes messages from eNB 605, UE A 607, and UE B 609.

Without loss of generality, and considering a situation where the operating mode switch is initiated by UE A 607, UE A 607 may initiate the operating mode switch by transmitting a request to eNB 605. The request asks eNB 605 to establish a DMC link between UE A 607 and UE B 609 (shown as event 615). As discussed previously, eNB may transmit a request to UE B 609, wherein the request requests that UE B 609 transmit a beacon (shown as event 617). As an example, in a 3GPP LTE compliant communications system, the beacon is an uplink signal. The beacon may be transmitted in the cellular portion of the band where uplink communications typically occur. Alternatively, the beacon may be transmitted on another component carrier, if carrier aggregation is used, either uplink or downlink. It may also be possible to have the beacon transmitted on the downlink part of the band.

eNB 605 may instruct UE A 607 where and/or when, as well as how UE B 609 will transmit the beacon (shown as event 619). As an example, the beacon transmitted by UE B 609 may be an aperiodic sounding reference signal (SRS), an uplink transmission that UE B 609 is required to transmit, and the like.

UE B 609 may make the uplink transmission (shown as event 621) to eNB 605, which is also detected by UE A 607. UE A 607 measures the channel between itself and UE B 609 according to the beacon (i.e., the uplink transmission) transmitted by UE B 609 and transmits a channel measurement report to eNB 605 (shown as event 623).

Figure 6B:
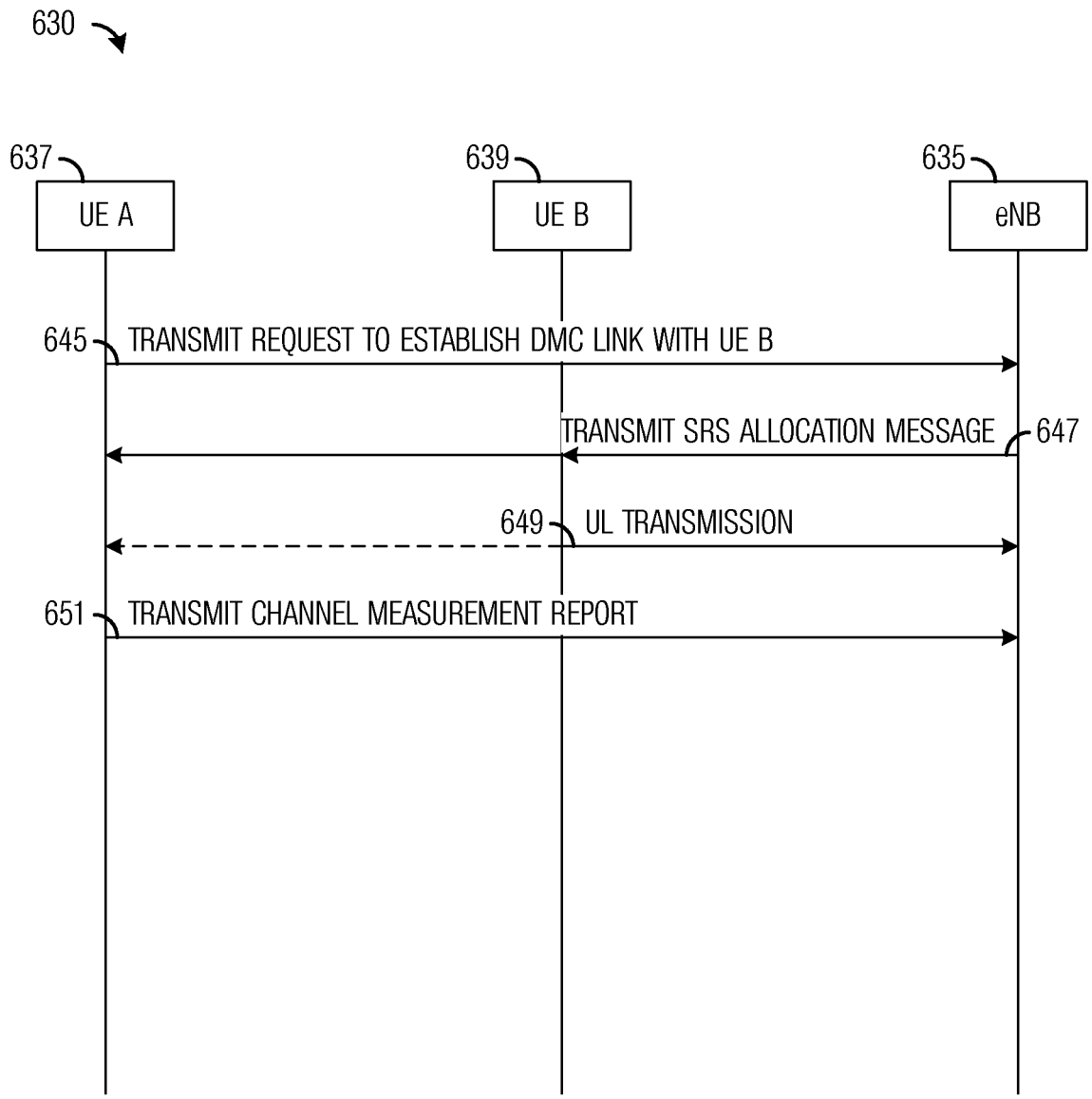
FIG. 6b illustrates an example diagram of a message exchange in a UE initiated operating mode switch for a 3GPP LTE compliant communications system utilizing multicast messaging according to example embodiments described herein.

FIG. 6b illustrates a diagram of a message exchange 630 in a UE initiated operating mode switch for a 3GPP LTE compliant communications system utilizing multicast messaging. Message exchange 630 includes messages from eNB 635, UE A 637, and UE B 639.

Without loss of generality, and considering a situation where the operating mode switch is initiated by UE A 637, UE A 637 may initiate the operating mode switch by transmitting a request to eNB 635. The request asks eNB 635 to establish a DMC link between UE A 637 and UE B 639 (shown as event 645).

Operations of eNB 635 may be simplified through the use of a multicast message. eNB 635 may transmit an allocation message (e.g., a SRS allocation message) as a multicast message to UE A 637 and UE B 639 (shown as event 647). The allocation message may request UE B 639 to transmit a beacon as well as specify how to transmit the beacon. The allocation message may also instruct UE A 637 where and/or when, as well as how UE B 639 will transmit the beacon.

UE B 639 makes the uplink transmission (shown as event 649) to eNB 635, which is also detected by UE A 637. UE A 637 measures the channel between itself and UE B 639 according to the beacon (i.e., the uplink transmission) transmitted by UE B 639 and transmits a channel measurement report to eNB 635 (shown as event 651).

According to an example embodiment, the allocation message may also request UE A 637 to transmit a beacon at a specified network resource as well as how to transmit the beacon. Additionally, the allocation message may also instruct UE B 639 where and/or when, as well as how UE A 637 will transmit the beacon. All or part of the instruction may be signaled explicitly while other parts of the instruction may be signaled implicitly.

Figure 6C:
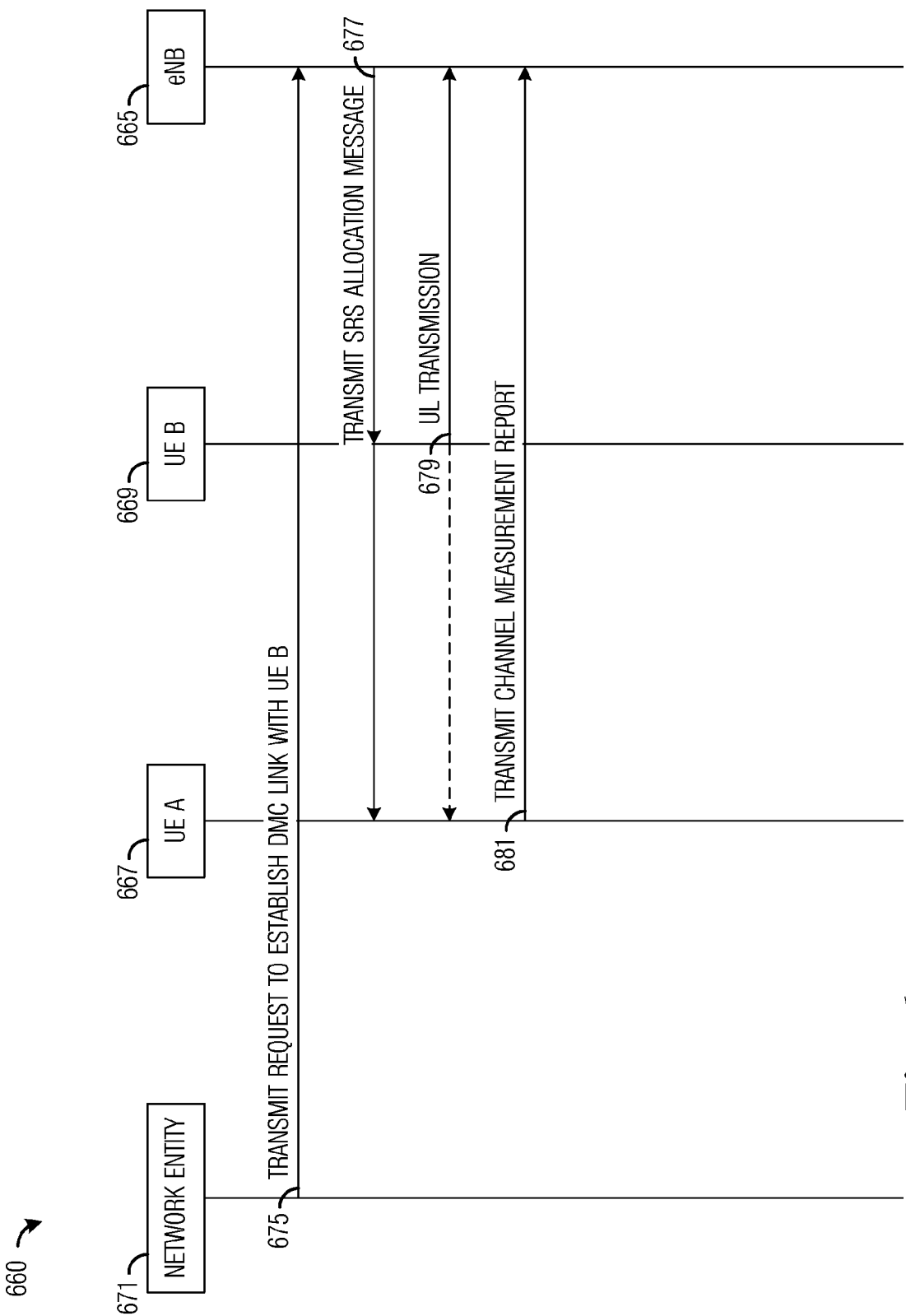
FIG. 6c illustrates an example diagram of a message exchange in an entity initiated operating mode switch for a 3GPP LTE compliant communications system utilizing a multicast messaging according to example embodiments described herein.

FIG. 6c illustrates a diagram of a message exchange 660 in an entity initiated operating mode switch for a 3GPP LTE compliant communications system utilizing a multicast messaging. Message exchange 660 includes messages from eNB 665, UE A 667, UE B 669, and network entity 671.

Network entity 671 may initiate the operating mode switch by transmitting a request to eNB 665, where the request requests that eNB 665 establishes a DMC link between UE A 667 and UE B 669 (shown as event 675). Examples of network entity 671 include a UE not involved in the DMC link, another eNB, a MME, a BSC, an OAM, and the like Operations of eNB 665 may be simplified through the use of a multicast message. eNB 665 may transmit an allocation message (e.g., a SRS allocation message) as a multicast message to UE A 667 and UE B 669 (shown as event 677). The allocation message may request UE B 669 to transmit a beacon as well as specify how to transmit the beacon. The allocation message may also instruct UE A 667 where and/or when, as well as how UE B 669 will transmit the beacon. All or part of the instruction may be signaled explicitly while other parts of the instruction may be signaled implicitly.

UE B 669 makes the uplink transmission (shown as event 679) to eNB 665, which is also detected by UE A 667. UE A 667 measures the channel between itself and UE B 669 according to the beacon (i.e., the uplink transmission) transmitted by UE B 669 and transmits a channel measurement report to eNB 665 (shown as event 681).

According to an example embodiment, the allocation message may also request UE A 667 to transmit a beacon as well as specify how to transmit the beacon. Additionally, the allocation message may also instruct UE B 669 where and/or when, as well as how UE A 667 will transmit the beacon. All or part of the instruction may be signaled explicitly while other parts of the instruction may be signaled implicitly.

Figure 7:
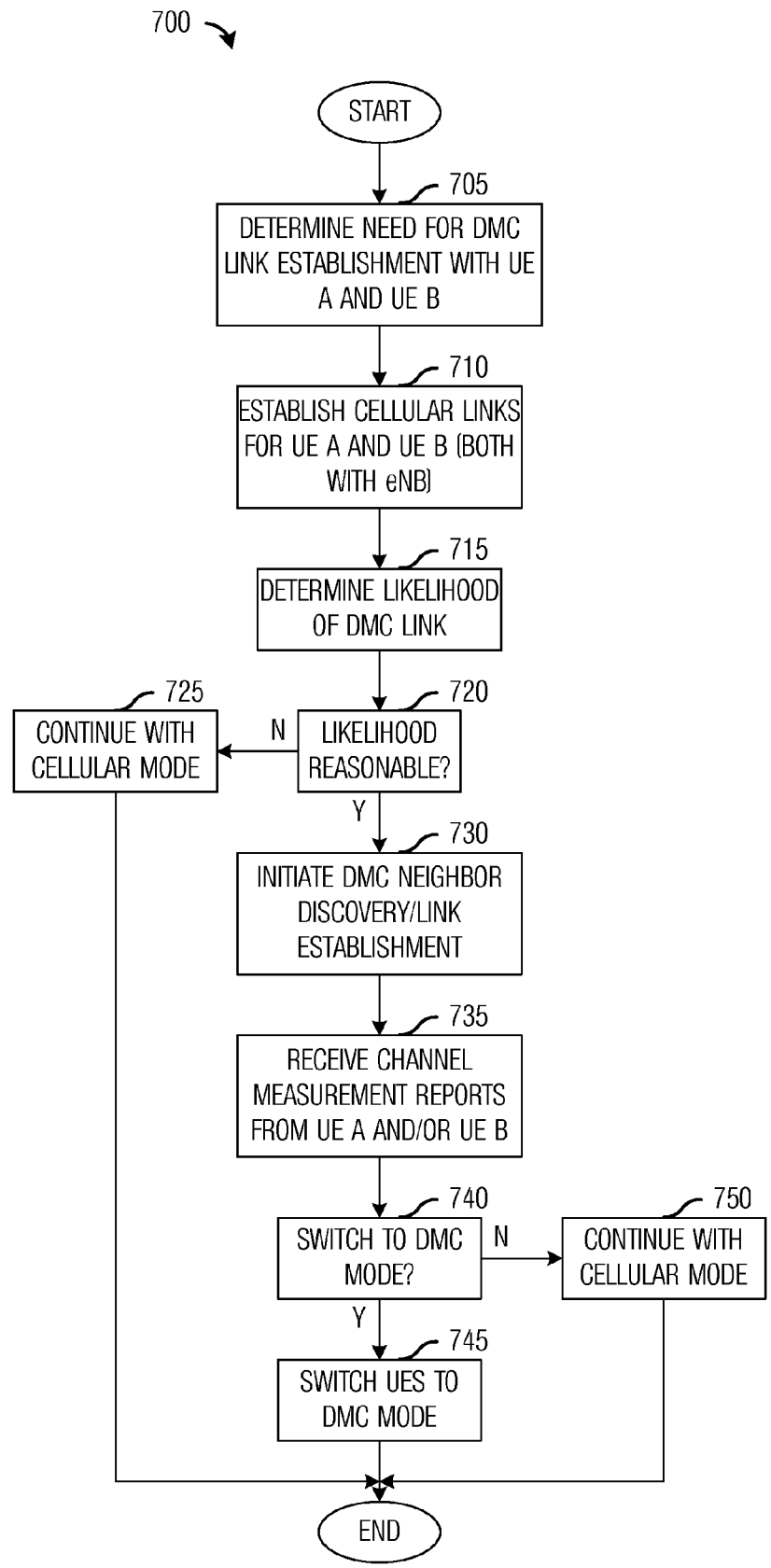
FIG. 7 illustrates an example flow diagram of operations occurring in an eNB that is participating in an operating mode switch for UEs using a cellular based entry technique according to example embodiments described herein.

FIG. 7 illustrates a flow diagram of operations 700 occurring in an eNB that is participating in an operating mode switch for UEs using a cellular based entry technique. Operations 700 may be indicative of operations occurring in an eNB, such as eNB 405 of FIG. 4, as the eNB participates in the operating mode switch.

Operations 700 may begin with the eNB determining a need for establishing a DMC link for two or more UEs served by the eNB (block 705). As an example, the eNB may determine the need to establish the DMC link on its own or the eNB may receive a request to establish the DMC link. As an example, the eNB may determine the need on its own by evaluating conditions, such as traffic load, available network resources to be reallocated, availability of UEs to operate in a DMC mode, interference impact, and the like, to determine if there is a need to establish a DMC link. As another example, the eNB may receive the request for establishing the DMC link from a UE, another eNB, a MME, a BSC, an OAM, and the like.

For discussion purposes, considering a situation where the eNB has determined a need for establishing a DMC link between two UEs, e.g., UE A and UE B, then the eNB may establish cellular links for UE A and UE B if cellular links do not already exist (block 710).

The eNB may also determine a likelihood of success in establishing a DMC link for two or more UEs (block 715). As an example, the eNB may examine factors such as where the UEs are operating (e.g., the UEs are operating in a single cell, the UEs are operating in neighboring cells, the UEs are operating in far-apart cells, and the like), the eNB may also examine radio conditions of each of the UEs (as an example, if a first UE has significantly greater path loss than a second UE, then establishing a DMC link may not be desirable), and the like.

The eNB may perform a check to determine if the likelihood of success in establishing a DMC link is reasonable (block 720). As an example, the eNB may compare the likelihood of success with a threshold. If the likelihood of success in establishing a DMC link is not reasonable, the eNB may have the UEs continue operating in their current operating mode, e.g., cellular communications (block 725).

However, if the likelihood of success in establishing a DMC link is reasonable, the eNB may initiate a DMC discovery/link establishment procedure to evaluate a DMC link between the UEs (block 730). As an example, the eNB evaluates the DMC link by having at least one of the UEs (e.g., UE A or UE B) measure a channel between the two UEs with the other UE (e.g., UE B or UE A) transmitting a beacon, such as a reference signal, to assist the UE in its measurement of the channel.

The eNB may receive a channel measurement report from the UE (block 735). The eNB may receive the channel measurement report from either UE A or UE B, depending on which UE made the channel measurement, or the eNB may receive channel measurement reports from both UEs if both UEs made channel measurements. As an example, the eNB may receive a measurement report including a SNR, a SINR, interference level, and the like. It is noted that channel measurement reports from each UE involved in the DMC link may result in a more accurate evaluation of the DMC link, however, it is not necessary to have measurement reports from each UE.

The eNB may perform a check to determine if the UEs should switch to DMC operating mode (block 740). As an example, the decision to switch the UEs to the DMC operating mode may be made according to the channel measurement reports. As an example, if the channel measurement report(s) indicates that the DMC link will be a good quality link, then the eNB may switch the UEs into the DMC operating mode (block 745). However, if the channel measurement report(s) indicates that the DMC link will be a poor quality link, then the eNB may have the UEs continue operating in their current operating mode, e.g., cellular communications (block 750).

It is noted that some of the operations described herein may be optional in nature. The optional operations may help to produce better results or improve performance. However, the optional operations may not be required.

Figure 8:
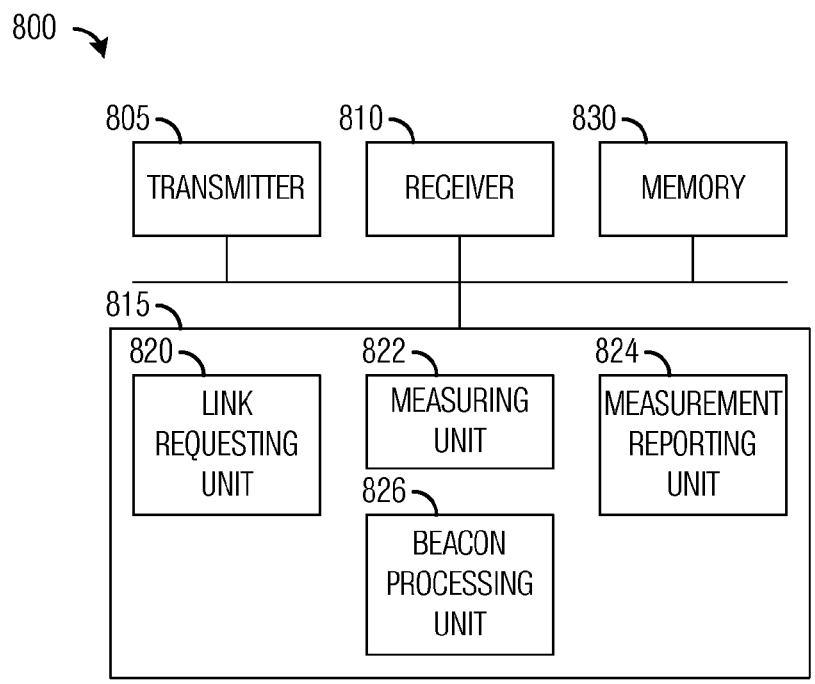
FIG. 8 illustrates an example communications device according to example embodiments described herein.

FIG. 8 illustrates a diagram of a communications device 800. Communications device 800 may be an implementation of a UE of a communications system. Communications device 800 may be used to implement various ones of the embodiments discussed herein. As shown in FIG. 8, a transmitter 805 is configured to send messages, information, beacons, and the like, and a receiver 810 is configured to receive messages, information, beacons, and the like. Transmitter 805 and receiver 810 may have a wireless interface, a wireline interface, or a combination thereof.

A link requesting unit 820 is configured to request an establishment of a DMC link for communications device 800 and at least one other communications device. Link requesting unit 820 may transmit a message to an eNB serving communications device 800 requesting the establishment of the DMC link. A measuring unit 822 is configured to measure a channel between communications device 800 and a source of a beacon, such as another communications device, using the beacon transmitted by the source of the beacon (i.e., the other communications device). Measuring unit 822 detects the beacon at network resources, e.g., where, when, and/or how, as specified by the eNB. Measuring unit 822 may make a SNR, SINR, and the like, measurement using the beacon.

A measurement reporting unit 824 is configured to generate a channel measurement report according to the measurement of the channel made by measuring unit 822. The channel measurement report may be transmitted by transmitter 805 to the eNB serving communications device 800. A beacon processing unit 826 is configured to process a beacon received by communications device 800. Beacon processing unit 826 is also configured to generate a beacon to be transmitted by communications device 800. A memory 830 is configured to store channel measurements, beacon information, information about network resources, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, transmitter 805 and receiver 810 may be implemented as a specific hardware block, while link requesting unit 820, measuring unit 822, measurement reporting unit 824, and beacon processing unit 826 may be software modules executing in a processor 815, such as a microprocessor, a digital signal processor, a custom circuit, or a custom compiled logic array of a field programmable logic array.

Figure 9:
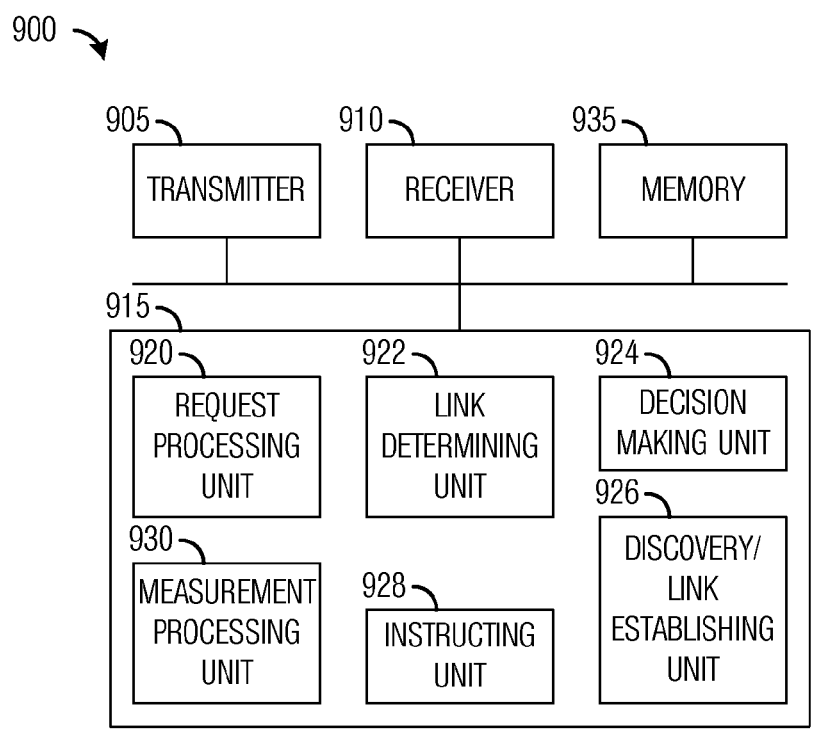
FIG. 9 illustrates an example communications controller according to example embodiments described herein.

FIG. 9 illustrates a diagram of a communications controller 900. Communications controller 900 may be an implementation of a communications controller, such as an eNB, a base station, a controller, and the like, of a communications system. Communications controller 900 may be used to implement various ones of the embodiments discussed herein. As shown in FIG. 9, a transmitter 905 is configured to send messages, information, beacons, and the like, and a receiver 910 is configured to receive messages, information, beacons, and the like. Transmitter 905 and receiver 910 may have a wireless interface, a wireline interface, or a combination thereof.

A request processing unit 920 is configured to process a request for the establishment of a DMC link. The request for the establishment of the DMC link may be received from a communications device, such as a UE, another communications controller, a MME, a BSC, an OAM, and the like. A link determining unit 922 is configured to determine a need for a DMC link. Link determining unit 922 determines the need for the DMC link according to factors, such as, traffic load, available network resources to be reallocated, availability of UEs to operate in a DMC mode, and the like. A decision making unit 924 is configured to determine if the DMC link is needed, as well as a likelihood of success in establishing the DMC link exceeds a specified threshold. Decision making unit 924 is also configured to determine if communications devices that will use the DMC link should switch operating modes, e.g., from cellular mode to DMC mode, and vice versa.

A discovery and/or link establishing unit (discovery/link establishing unit) 926 is configured to evaluate the DMC link. Discovery/link establishing unit 926 may evaluate the DMC link by having a subset of communications devices that will be using the DMC link measure a channel between themselves and other communications devices that will also be using the DMC link and may include as well other devices that will not be using the DMC link. Discovery/link establishing unit 926 may have some of the communications devices transmit beacons, while other communications devices measure the channels according to the transmitted beacons. An instructing unit 928 is configured to generate instructions to the communications devices for beacon transmission and/or channel measurement. A measurement processing unit 930 is configured to process channel measurement reports received from the communications devices. Decision making unit 924 is also configured to determine if communications devices that will use the DMC link should switch operating modes, e.g., from cellular mode to DMC mode, and vice versa. The operating mode switch may be based on the channel measurement reports. A memory 935 is configured to store channel measurement reports, channel measurements, beacon information, information about network resources, thresholds, communications device information, and the like.

The elements of communications controller 900 may be implemented as specific hardware logic blocks. In an alternative, the elements of communications controller 900 may be implemented as software executing in a processor, controller, application specific integrated circuit, or so on. In yet another alternative, the elements of communications controller 900 may be implemented as a combination of software and/or hardware.

As an example, transmitter 905 and receiver 910 may be implemented as a specific hardware block, while request processing unit 920, link determining unit 922, decision making unit 924, discovery/link establishing unit 926, instructing unit 928, and measurement processing unit 930 may be software modules executing in a processor 915, such as a microprocessor, a digital signal processor, a custom circuit, or a custom compiled logic array of a field programmable logic array.

Although the present disclosure and its advantages have been described in detail, it should be understood that various changes, substitutions and alterations can be made herein without departing from the spirit and scope of the disclosure as defined by the appended claims.

What is claimed is:

1. A method of communicating with a first user equipment (UE) and a second UE, wherein at least one of the first UE and the second UE is communicating on a first cellular link, the method comprising:
   establishing by a communications controller, a second cellular link between the first UE and the communications controller, and a third cellular link between the second UE and the communications controller;
   requesting, by the communications controller after establishing the second and third cellular links, at least one of the first UE and the second UE to participate in an evaluation procedure for a direct communications (DMC) link between the first UE and the second UE;
   transmitting, by the communications controller to at least the second UE, resource information of a first network resource location;
   transmitting, by the communications controller to the first UE, a first beacon request requesting that the first UE transmit a first beacon at the first network resource location; receiving, by the communications controller, a report from at least the second UE indicating discovery information comprising proximity-indicative information about the first UE and at least one other UE; and
   maintaining, by the communications controller, at least one of the second cellular link or the third cellular link in response to a potential quality of the DMC link exceeding a predetermined threshold.

2. The method of claim 1, further comprising determining a likelihood of the DMC link between the first UE and the second UE.

3. The method of claim 2, wherein determining the likelihood of the DMC link comprises determining if the first UE and the second UE are operating in a single cell, determining if radio conditions of the first UE and radio conditions of the second UE are similar, or a combination thereof.

4. The method of claim 1, further comprising receiving a request to establish the DMC link between the first UE and the second UE.

5. The method of claim 4, wherein the request to establish the DMC link is received from one of the first UE, the second UE, a communications controller not serving the first UE and the second UE, a mobility management entity, a base station controller, and an operations and management server.

6. The method of claim 1, further comprising requesting at least one of the first UE and the second UE to measure an interference level on the DMC link between the first UE and the second UE due to a fourth cellular link.

7. The method of claim 1, further comprising determining a need to establish the DMC link between the first UE and the second UE.

8. The method of claim 1, further comprising:
   transmitting, to the second UE, a second beacon request requesting that the second UE transmit a second beacon at a second network resource location;
   transmitting, to the first UE, second resource information about the second network resource location; and
   receiving a second report from the first UE indicating second discovery information about the second UE.

9. The method of claim 1, wherein the first beacon is transmitted in at least one of an uplink portion of a frequency band where transmissions occur and a downlink portion of the frequency band.

10. The method of claim 1, wherein the first beacon is a sounding reference signal.

11. The method of claim 1, wherein the DMC link between the first UE and the second UE utilizes a first component carrier, and wherein the first beacon is transmitted on a second component carrier.

12. The method of claim 1, wherein the first beacon request, and the resource information are transmitted to the first UE and the second UE in a multicast message.

13. The method of claim 8, further comprising:
   transmitting, to the second UE, a first measurement request requesting that the second UE measure a first channel between the first UE and the second UE according to the first beacon; and
   transmitting, to the first UE, a second measurement request requesting that the first UE measure a second channel between the second UE and the first UE according to the second beacon.

14. The method of claim 1, further comprising switching the first UE and the second UE to operate in a DMC mode.

15. A method of operating a first user equipment (UE), the method comprising:
   establishing, by the first UE, a first cellular link between the first UE and a communications controller, wherein the communications controller has a second cellular link established between the communications controller and a second UE;
   receiving, by the first UE from the communications controller after the first and second cellular links are established, a participation request to participate in an evaluation procedure for a direct communications (DMC) link between the first UE and the second UE;
   receiving, by the first UE from the communications controller, resource information about a first network resource location of a first beacon transmitted by the second UE;
   transmitting, by the first UE to the communications controller, a report indicating discovery information comprising proximity-indicative information about the second UE and at least one other UE; and
   maintaining, by the first UE, the first cellular link in response to a potential quality of the DMC link exceeding a predetermined threshold.

16. The method of claim 15, further comprising:
   attempting, by the first UE prior to transmitting the report, to receive the first beacon transmitted by the second UE at the first network resource location.

17. The method of claim 16, further comprising:
   receiving, from the communications controller, a beacon request requesting that the first UE transmit a second beacon at a second network resource location; and
   transmitting the second beacon.

18. The method of claim 17, wherein the resource information and the beacon request are received by the first UE in a multicast message.

19. The method of claim 15, further comprising:
   receiving a link allocation for the DMC link; and
   switching to a DMC operating mode.

20. The method of claim 19, further comprising the first UE transmitting to the second UE using at least one of downlink resources and uplink resources.

21. The method of claim 19, further comprising the first UE transmitting to the second UE using Orthogonal Frequency Division Multiplexing.

22. The method of claim 19, further comprising the first UE transmitting to the second UE in at least one of an uplink cellular transmission band and a downlink cellular transmission band.

23. The method of claim 19, further comprising the first UE transmitting to the second UE on an additional component carrier.

24. The method of claim 19, further comprising the first UE receiving a transmission from a third UE over the DMC link using Discrete Fourier Transform Spread Orthogonal Frequency Division Multiplexing.

25. The method of claim 19, further comprising the first UE transmitting to the second UE using at least one of time multiplexing and frequency multiplexing.

26. A communications controller comprising:
a processor configured to:
establish a second cellular link between a first user equipment (UE) and the communications controller, and a third cellular link between a second UE and the communications controller;
request, after the second and third cellular links are established, at least one of the first UE and the second UE to participate in an evaluation procedure for a direct communications (DMC) link between the first UE and the second UE, wherein at least one of the first UE and the second UE are communicating on a first cellular link; and
maintain at least one of the second cellular link or the third cellular link in response to a potential quality of the DMC link exceeding a predetermined threshold;
a transmitter operatively coupled to the processor, the transmitter configured to transmit to at least the second UE, resource information of a first network resource location, and to transmit to the first UE, a first beacon request requesting that the first UE transmit a first beacon at the first network resource location; and
a receiver operatively coupled to the processor, the receiver configured to receive a report from at least the second UE indicating discovery information comprising proximity-indicative information about the first UE and at least one other UE.

27. The communications controller of claim 26, wherein the processor is configured to determine a likelihood of the DMC link between the first UE and the second UE.

28. The communications controller of claim 26, wherein the receiver is configured to receive a request to establish the DMC link between the first UE and the second UE.

29. The communications controller of claim 26, wherein the processor is configured to determine a need to establish the DMC link between the first UE and the second UE.

30. The communications controller of claim 26, further comprising the transmitter configured to transmit, to the second UE, a second beacon request asking the second UE to transmit a second beacon at a second network resource location, and to transmit, to the second UE, second resource information about the second network resource location; and further comprising the receiver configured to receive a second report from the first UE indicating second discovery information about the second UE.

31. A first user equipment (UE) comprising:
a processor configured to establish a first cellular link between the first UE and a communications controller, wherein the communications controller has a second cellular link established between the communications controller and a second UE;
a receiver operatively coupled to the processor, the receiver configured to receive, from the communication controller after the first and second cellular links are established, a participation request to participate in an evaluation procedure for a direct communications (DMC) link between the first UE and the second UE, and to receive resource information about a first network resource location of a first beacon transmitted by the second UE; and
a transmitter operatively coupled to the processor, the transmitter configured to transmit, to the communications controller, a report indicating discovery information comprising proximity-indicative information about the second UE and at least one other UE;
wherein the processor is further configured to maintain the first cellular link in response to a potential quality of the DMC link exceeding a predetermined threshold.

32. The first UE of claim 31, wherein the processor is configured to attempt to receive the first beacon transmitted by the second UE at the first network resource location, prior to the transmitter transmitting the report.

33. The first UE of claim 32, wherein the receiver is configured to receive, from the communications controller, a beacon request requesting that the first UE transmit a second beacon at a second network resource location, and wherein the transmitter is configured to transmit the second beacon.

34. The first UE of claim 31, wherein the receiver is configured to receive a link allocation for the DMC link, and wherein the processor is configured to switch to a DMC operating mode.

35. The method of claim 1, wherein the second cellular link comprises the first cellular link.

36. The communications controller of claim 26, wherein the second cellular link comprises the first cellular link.

* * * * *